United States Patent
Mo (10) Patent No.: US 10,074,998 B2
(45) Date of Patent: Sep. 11, 2018

(54) CHARGING SYSTEM, POWER SUPPLY DEVICE AND AIRCRAFT

(71) Applicant: SZ DJI TECHNOLOGY CO., LTD., Shenzhen (CN)

(72) Inventor: Weiyu Mo, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 90 days.

(21) Appl. No.: 15/374,868

(22) Filed: Dec. 9, 2016

(65) Prior Publication Data

US 2017/0126031 A1    May 4, 2017

Related U.S. Application Data (63) Continuation of application No. PCT/CN2014/079727, filed on Jun. 12, 2014.

(51) Int. Cl.
*H02J 7/00* (2006.01)
*B64F 1/36* (2017.01)
(Continued)

(52) U.S. Cl.
CPC ......... *H02J 7/0021* (2013.01); *B60L 11/1816* (2013.01); *B60L 11/1833* (2013.01);
(Continued)

(58) Field of Classification Search
CPC ............ H02J 7/0021; H02J 2007/0096; H02J 7/0045; B60L 11/1816; B60L 11/1833;
(Continued)

(56) References Cited

U.S. PATENT DOCUMENTS

| 8,035,255 B2* | 10/2011 | Kurs | B60L 11/007 |
| | | | 307/104 |
| 8,373,387 B2* | 2/2013 | Bourilkov | H02J 7/025 |
| | | | 320/108 |

(Continued)

FOREIGN PATENT DOCUMENTS

| CN | 1478670 A | 3/2004 |
| CN | 1634726 A | 7/2005 |

(Continued)

OTHER PUBLICATIONS

The World Intellectual Property Organization (WIPO) International Search Report for PCT/CN2014/079727 dated Oct. 27, 2014 p. 1-6.

*Primary Examiner* — Calvin Cheung
(74) *Attorney, Agent, or Firm* — Anova Law Group, PLLC (57) ABSTRACT

A charging system includes a power supply device and a charging device. The power supply device includes a power supply and at least two exposed power supply panels connected to the power supply. The at least two power supply panels are electrically insulated from each other and include at least one anode power supply panel connected to an anode of the power supply and at least one cathode power supply panel connected to a cathode of the power supply. The at least one anode power supply panel and the at least one cathode power supply panel are alternately arranged. The charging device includes a charging circuit and at least two charging contacts each being connected to a charging anode and a charging cathode of the charging circuit respectively through a diode. The charging device is configured to contact the power supply panels through the charging contacts.

20 Claims, 4 Drawing Sheets

(51) Int. Cl.
    *B64C 39/02*     (2006.01)
    *G05D 1/00*     (2006.01)
    *B60L 11/18*     (2006.01)

(52) U.S. Cl.
    CPC ............ *B64C 39/024* (2013.01); *B64F 1/362* (2013.01); *G05D 1/0011* (2013.01); *H02J 7/0045* (2013.01); *B64C 2201/042* (2013.01); *H02J 2007/0096* (2013.01)

(58) Field of Classification Search
    CPC . B64C 39/024; B64C 2201/042; B64F 1/362; G05D 1/0011
    See application file for complete search history.

(56) References Cited

U.S. PATENT DOCUMENTS

| | | | | |
|---|---|---|---|---|
| 9,381,878 | B2* | 7/2016 | Ichikawa | B60L 1/006 |
| 9,806,824 | B2* | 10/2017 | Nakahara | H02J 5/005 |
| 2009/0058361 | A1* | 3/2009 | John | A61N 1/3785 |
| | | | | 320/128 |
| 2013/0020862 | A1* | 1/2013 | Miller | H02J 5/005 |
| | | | | 307/9.1 |
| 2014/0035521 | A1* | 2/2014 | Endo | H02J 5/005 |
| | | | | 320/108 |
| 2014/0306649 | A1* | 10/2014 | Akiyoshi | H02J 5/005 |
| | | | | 320/107 |
| 2014/0327319 | A1* | 11/2014 | Byun | H02J 7/025 |
| | | | | 307/104 |
| 2015/0077040 | A1* | 3/2015 | Longdon | H02J 7/0052 |
| | | | | 320/107 |
| 2015/0188339 | A1* | 7/2015 | Green | H02J 7/0042 |
| | | | | 320/108 |
| 2015/0372497 | A1* | 12/2015 | Bae | H02J 50/12 |
| | | | | 307/104 |

FOREIGN PATENT DOCUMENTS

| | | |
|---|---|---|
| CN | 202930986 U | 5/2013 |
| CN | 103354382 A | 10/2013 |
| CN | 203352208 U | 12/2013 |
| WO | 2014012026 A1 | 1/2014 |

\* cited by examiner

CHARGING SYSTEM, POWER SUPPLY DEVICE AND AIRCRAFT

CROSS-REFERENCE TO RELATED APPLICATION

This is a continuation application of International Application No. PCT/CN2014/079727, filed on Jun. 12, 2014, the entire contents of which are incorporated herein by reference.

TECHNICAL FIELD

The present disclosure relates to the technical field of electronics, and particularly, to a charging system, a power supply device and an aircraft.

BACKGROUND OF THE DISCLOSURE

A charger may charge an apparatus such as an electric aircraft, a robot and the like using power supplies such as power lines, batteries, etc. The apparatus is typically charged by a socket connected to the power lines and a charger including a plug and a charging circuit. The charger may be a separate unit or an unit integral to the apparatus such as an aircraft, a robot and the like. The charger may be inserted into a jack of the socket by stretching and retracting the plug, so as to charge the apparatus.

The existing charging technologies have been well developed for stable charging at a relatively low cost. However, in a scenario where the apparatus such as an aircraft, a robot and the like is to be charged automatically, if the conventional plug and socket are used, the apparatus such as an aircraft, a robot and the like may have to precisely recognize a position of the socket, the jack and the plug, demanding significant calculating power and a higher cost. In addition, the algorithm may be complex to implement.

SUMMARY OF THE DISCLOSURE

Embodiments of the present disclosure provide a charging system, a power supply device and an aircraft, which can automatically charge an apparatus in a simple and manner.

In accordance with the present disclosure, there is provided a charging system including a power supply device and a charging device. The power supply device includes a power supply and at least two exposed power supply panels connected to the power supply. The at least two power supply panels are electrically insulated from each other and include at least one anode power supply panel connected to an anode of the power supply and at least one cathode power supply panel connected to a cathode of the power supply. The at least one anode power supply panel and the at least one cathode power supply panel are alternately arranged. The charging device includes a charging circuit and at least two charging contacts each being connected to a charging anode and a charging cathode of the charging circuit respectively through a diode. The charging device is configured to contact the power supply panels through the charging contacts to charge a connected load.

In some embodiments, each of the charging contacts includes a contact portion configured to contact the power supply panels. A distance between any two points on a contact plane of the contact portion for contacting the supply panel is less than a smallest distance between any two of the power supply panels.

In some embodiments, the contact portion includes a columnar, and the contact plane is a bottom plane of the columnar.

In some embodiments, each of the charging contacts further includes a fixed portion and an elastic portion, one end of the elastic portion being connected with the fixed portion, and another end of the elastic portion being connected with the contact portion.

In some embodiments, the power supply device further includes a controller configured to identify whether any of the power supply panels are in contact with one or more of the charging contacts.

In some embodiments, the controller is further configured to, if one of the at least one anode power supply panel and one of the at least one cathode power supply panel are identified, control the power supply to supply power to the identified power supply panels.

In some embodiments, the controller is further configured to identify whether any of the power supply panels are in contact with one or more of the charging contacts by detecting whether pressure-induced deformation exists in any of the power supply panels and identifying the power supply panel that has pressure-induced deformation as being in contact with one or more of the charging contacts.

In some embodiments, the controller is further configured to identify whether any of the power supply panels are in contact with one or more of the charging contacts by supplying power to the power supply panels, detecting whether an electric current is generated in any of the power supply panels, and identifying the power supply panel that has the electric current as being in contact with one or more of the charging contacts.

Also in accordance with the present disclosure, there is provided a power supply device including a power supply and at least two exposed power supply panels connected to the power supply. The at least two power supply panels are electrically insulated from each other and include at least one anode power supply panel connected to an anode of the power supply and at least one cathode power supply panel connected to a cathode of the power supply. The at least one anode power supply panel and the at least one cathode power supply panel are alternately arranged. The power supply device is configured to be in contact with charging contacts of an external apparatus through the power supply panels to supply power to the external apparatus.

In some embodiments, the power supply device further includes a controller configured to identify whether any of the power supply panels are in contact with one or more of the charging contacts.

In some embodiments, the controller is further configured to, if one of the at least one anode power supply panel and one of the at least one cathode power supply panel are identified, control the power supply to supply power to the identified power supply panels.

In some embodiments, the power supply device further includes a communication module. The controller is further configured to transmit to the communication module a movement control signal if no power supply panel is identified, only one power supply panel is identified, or only multiple anode power supply panels or multiple cathode power supply panels are identified, and the communication module is configured to transmit the movement control signal to the external apparatus to control the external apparatus to move in response to the movement control signal.

In some embodiments, the power supply device further includes a cleaning component configured to perform cleaning operation on the power supply panels based on a preset control rule.

Also in accordance with the present disclosure, there is provided an aircraft including a power supply module and a charging device coupled to the power supply module. The charging device includes a charging circuit and at least two charging contacts each being connected to a charging anode and a charging cathode of the charging circuit respectively through a diode. The charging device is configured to contact at least two power supply panels of an external power supply device through the charging contacts to charge the power supply module.

In some embodiments, each of the charging contacts includes a contact portion configured to contact the power supply panels. A distance between any two points on a contact plane of the contact portion for contacting the supply panel is less than a smallest distance between any two of the power supply panels.

In some embodiments, the contact portion includes a columnar and the contact plane is a bottom plane of the columnar.

In some embodiments, each of the charging contacts further includes a fixed portion and an elastic portion. One end of the elastic portion being connected with the fixed portion and another end of the elastic portion is connected with the contact portion.

In some embodiments, the aircraft further includes a probing device configured to identify locations of the at least two power supply panels of the external power supply device to instruct the aircraft to land.

In some embodiments, the aircraft further includes a communication module configured to instruct the aircraft to take off, move, and land in response to a movement control signal transmitted from the external power supply device.

In some embodiments, the aircraft further includes a detecting device configured to instruct the aircraft to take off, move, and land when detecting that no charging current is generated in the charging circuit after the aircraft lands on the supply panels of the external power supply device.

With the embodiments of the disclosure, apparatuses such as various small unmanned aerial vehicles, remotely controlled vehicles, robots, etc., can have a quick access to a charging circuit at a relatively low cost without a need of precise positioning and moving, thus lowering a requirement and a difficulty of controlling the apparatuses. Meanwhile, a quick charging at large current may be possible due to a good electrical contact between charging panels and charging contacts, improving an efficiency of charging.

DETAILED DESCRIPTION OF THE DISCLOSURE

Technical solutions in the embodiments of the present disclosure will be described below with reference to the figures of the present disclosure. Apparently, the embodiments described below are only a portion but not all the embodiments of the present disclosure. Following the spirit of the embodiments of the present disclosure, all the other embodiments which may occur to those ordinarily skilled in the art without any inventive effort shall fall into the claimed scope of the present disclosure.

In some embodiments of the present disclosure, a power supply device may be arranged on the ground as a power supply station. Supply panels, also referred to as "power supply panels," exposed to the external environment may be connected to a power supply, i.e., a power source, such as a utility power, a high-capacity battery and the like, and may be placed horizontally or vertically. An aircraft such as a UAV (Unmanned Aerial Vehicle), a remotely controlled vehicle, a robot and the like may easily and quickly contact the supply panels exposed to the environment through a charging device having two or more charging contacts, thereby a charging may be performed.

Figure 1:
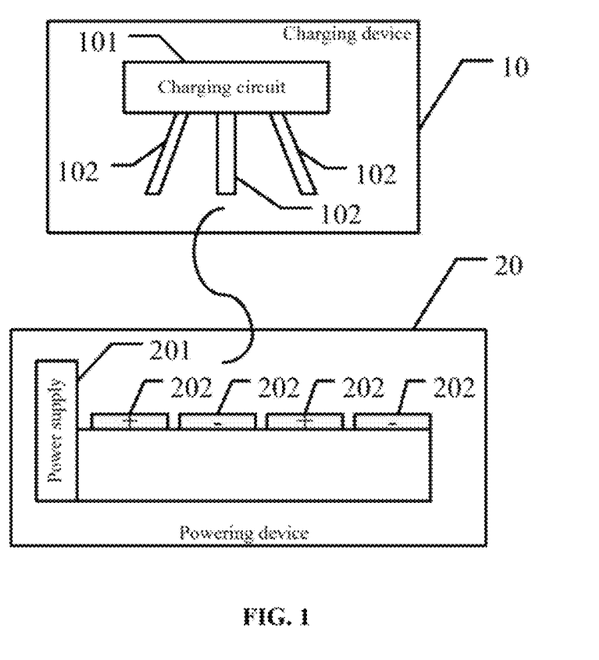
FIG. 1 is a schematic diagram showing a charging system according to an embodiment of the present disclosure.

Particularly, referring to FIG. 1, which is a schematic diagram showing a charging system according to an embodiment of the present disclosure, the charging system according to an embodiment of the present disclosure may include a power supply device 20 and a charging device 10. The power supply device 20 may be arranged in a power supply station on the ground. In some embodiments, the power supply device 20 may be a platform for an aircraft to land and be automatically charged. In some embodiments, the power supply device 20 may be a charging post for an apparatus, also referred to as an "external apparatus," such as a remotely controlled vehicle on the ground, a robot, etc.

The power supply device 20 may include a power supply 201 and at least two supply panels 202 exposed to the external environment. In some embodiments, the supply panels 202 may be connected to the power supply 201, and those supply panels connected to an anode of the power supply 201 may be arranged alternately with those supply panels connected to a cathode of the power supply 201, with each two supply panels being electrically insulated from each other.

The charging device 10 may include at least two charging contacts 102 and a charging circuit 101 connected with the at least two charging contacts 102. In some embodiments, each charging contact 102 is connected with the charging anode and the charging cathode of the charging circuit 101 respectively through a diode.

The charging device 10 may contact the supply panels 202 through the charging contacts 102 to charge a connected load.

The power supply 201 may be a high-capacity battery or an electric device, such as a converter, configured to be coupled to a utility grid, for charging a corresponding apparatus such as an aircraft, a remotely controlled vehicle, a robot, etc. In some embodiments, the supply panels 202 may be, for example, copper plates, or removable electrically-conductive plates having a width and a length that can be adjusted manually as needed. The supply panels 202 may be configured to have a large size in order to facilitate a contact with the charging contacts 102 of the charging device 10.

Figure 2:
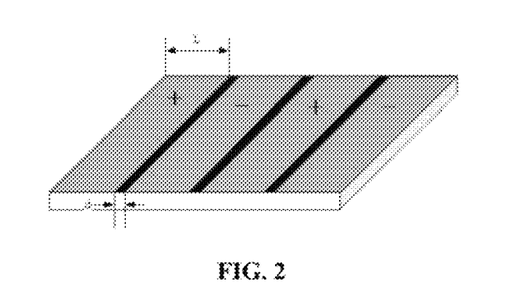
FIG. 2 is a schematic diagram showing supply panels in a power supply device according to an embodiment of the present disclosure.

In some embodiments of the present disclosure, as illustrated in FIG. 2, the supply panels 202 of the power supply device 20 may be strip-shaped copper sheets. In some embodiments, an insulating substrate may be provided, and copper sheets that are not electrically coupled to each other may be provided on the insulating substrate as the supply panels 202. As an example, a cuboid supply panels 202 having a width L and a length and thickness being set as needed may be provided. In some embodiments, a shape and size of the supply panels 202 may be set as needed as long as each two supply panels 202 are electrically insulated from each other and those supply panels connected to an anode of the power supply 201 are arranged alternately with those supply panels connected to a cathode of the power supply 201. In some embodiments, the supply panels 202 may be polygonal copper plates, such as triangular or pentagonal copper plates, with various sizes.

The number of supply panels 202 may be configured as needed. In some embodiments, a large amount of supply panels 202 may be provided to form a large area such that a plurality of apparatuses may be charged simultaneously.

Figure 3:
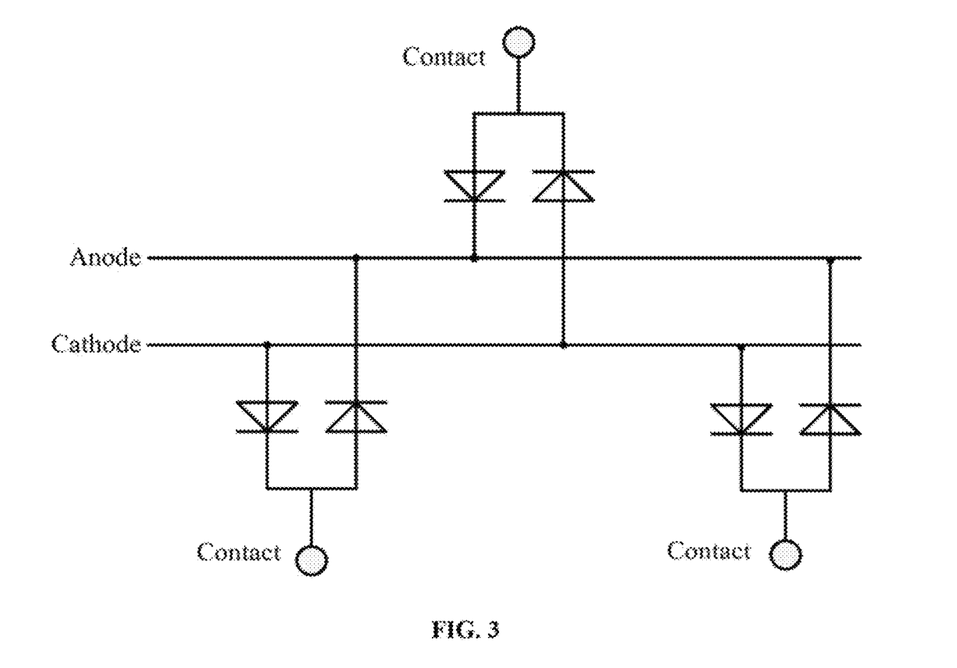
FIG. 3 is a circuit diagram showing charging contacts of a charging device according to an embodiment of the present disclosure.

FIG. 3 is a circuit diagram showing charging contacts 102 of a charging device 10 according to an embodiment of the present disclosure. As is apparent from FIG. 3, if a supply panel 202 in contact with a charging contact 102 is an anode supply panel, then the diode with an access to the charging anode may be turned on, and if the supply panel 202 in contact with the charging contact 102 is a cathode supply panel, then the diode with an access to the charging cathode may be turned on. When at least one of the three charging contacts 102 of the charging device 10 shown in FIG. 4 contacts an anode supply panel, and at least one of the three charging contacts 102 contact a cathode supply panel, then a load of the charging device 10 can be charged. A higher probability of both anode and cathode supply panels being contacted may be ensured with a larger amount of charging contacts 102.

In some embodiments, sizes of the charging contacts 102, the supply panels 202, and insulation spacing between the supply panels 202 may be set in order to enable a better and more stable contact between the charging contacts 102 and the anode and cathode supply panels 202 and to avoid a short-circuit.

In some embodiments, the shortest distance between each two supply panels 202 electrically insulated from each other may be set as an initial distance.

The charging contacts 102 may each include a contact portion configured to contact one of the supply panels 202. In some embodiments, a distance between any two points on a plane of the contact portion for contacting one of the supply panels 202 may be less than the initial distance. Hereinafter, the plane of the contact portion for contacting one of the supply panels 202 is also referred to as a "contact plane."

As shown in FIG. 2, a width of a supply panel 202 may be L, and a size of the insulation spacing, i.e., the initial distance, may be d. The distance between two points spaced the furthest away from each other on the contact plane of the contact portion should be less than d. For example, if the contact portion of a charging contact 102 is a cylinder, a diameter of a bottom of the cylinder contact portion, i.e., the contact plane, may be smaller than d to avoid the charging contact 102 from contacting both anode and cathode supply panels and to prevent a short-circuit from occurring. Further, the diameter of the bottom of the cylinder contact portion may infinitely approach d, i.e., be very close to d, but may not equal d. In some embodiments, a distance between two adjacent charging contacts 102 may range from L (inclusive) to 2L (inclusive), such that an apparatus such as an aircraft, a remotely controlled vehicle, a robot and the like may be more likely to contact both the anode and cathode supply panels while contacting the supply panels 202 for charging.

Figure 4:
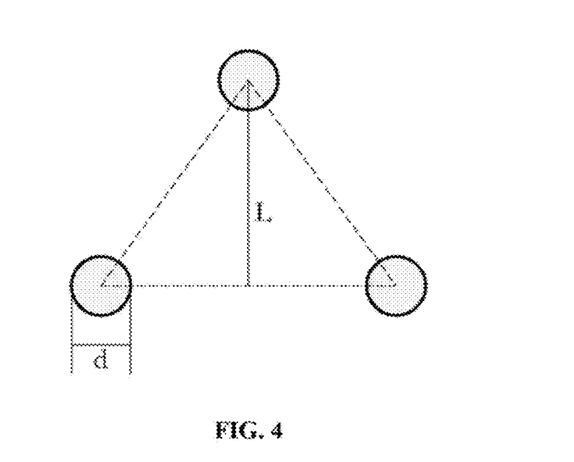
FIG. 4 is a schematic diagram showing charging contacts according to an embodiment of the present disclosure.
Figure 5:
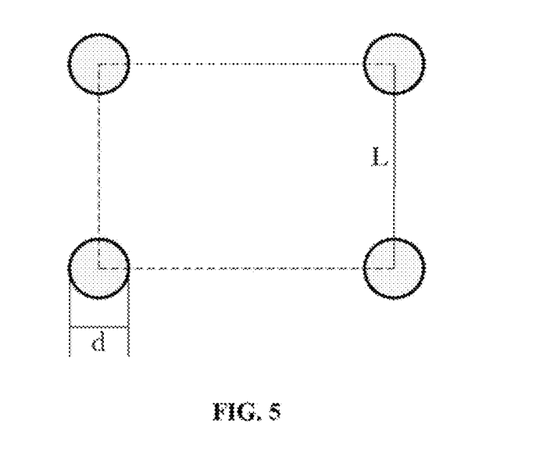
FIG. 5 is a schematic diagram showing charging contacts according to another embodiment of the present disclosure.
Figure 6:
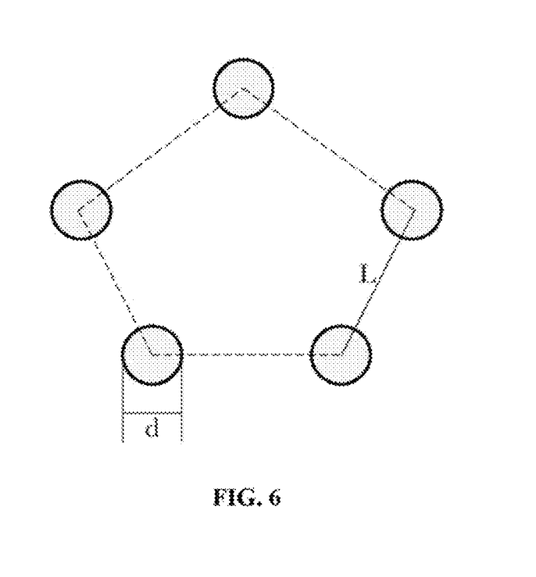
FIG. 6 is a schematic diagram showing charging contacts according to still another embodiment of the present disclosure.

In some embodiments, the charging contacts 102 may be foot stands of an unmanned aerial vehicle. Alternatively, the charging contacts 102 may be retractable probes installed on an apparatus such as a remotely controlled vehicle, a robot, etc. Each charging contact 102 may be a columnar, such as a cylinder, a prism and the like. In some embodiments, the shortest distance between two neighboring supply panels 202 electrically insulated from each other may be an initial distance. The charging contacts 102 may each include a contact portion configured to contact one of the supply panels 202, wherein the contact portion may be a columnar. A distance between any two points on a bottom of the columnar contact portion may be less than the initial distance. In some embodiments, the number of charging contacts 102 may be larger than or equal to 3, and the charging contacts 102 may be arranged in a regular polygon. FIG. 4 to FIG. 6 schematically show exemplary sizes and arrangements of the charging contacts 102 consistent with the present disclosure.

Optionally, at least one of the charging contacts 102 may further include a fixed portion and an elastic portion. In some embodiments, one end of the elastic portion may be connected with the fixed portion, and the other end of the elastic portion may be connected with the contact portion. The elastic portion may be a spring or another damping device. This design may reduce shock when the aircraft lands or when the remotely controlled vehicle or the robot contacts the supply panels 202, thereby alleviating a damage to the supply panels 202 and to the aircraft, the remotely controlled vehicle or the robot. In addition, this design may ensure a good contact between the charging contacts and the supply panels 202.

Optionally, the power supply device 20 may further include a controller.

In some embodiments, the controller may be configured to identify, among the supply panels 202 of the power supply device 20, one or more supply panels 202 that are in contact with the charging contacts 102 of the charging device 10, and to control the power supply 201 to supply power to the identified supply panels 202. Hereinafter, a supply panel in contact with a charging contact is also referred to as a "contacted supply panel."

In some instances, the controller may determine whether a supply panels 202 is in contact with a charging contact 102 by detecting whether there exists, for example, a pressure on the supply panel 202 or an electric current generated by the supply panels 202.

In some instances, when pressure-induced deformation is detected in at least one anode supply panel 202 and at least one cathode supply panel 202, such as two neighboring supply panels 202, electric power may be supplied to these contacted supply panels 202.

Alternatively, the power supply device 20 may control the power supply 201 to supply power to the respective supply panels 202. When one or more of the charging contacts 102 contact at least one anode supply panel 202 and at least one cathode supply panel 202, a loop may be formed, and a working current may be generated in circuits corresponding to the contacted supply panels 202. At this time, the power supply 201 may keep supplying power to these contacted supply panels 202 and stop supplying power to other supply panels 202. In some instances, the power supply 201 may be controlled to supply power to the respective supply panels 202 upon reception of a power request signal transmitted from a device like the charging device 10, such that a current signal can be detected. In some embodiments, the power supply device 20 may control the power supply 201 to supply power to the respective supply panels 202 for short periods of time according to a preset powering rule, for example, a periodic short powering rule, so as to detect a current signal.

By means of the controller, power can be supplied to an apparatus such as an aircraft, a remotely controlled vehicle, or a robot by supplying power only to those supply panels 202 that are in contact with charging contacts of the apparatus. As such, the number of supply panels 202 being powered can be reduced, and the risk of an accidental short-circuit can be effectively reduced.

Optionally, the power supply device 20 may further include a cleaning component configured to perform cleaning operations on the supply panels 202 according to a preset control rule. In some instances, the cleaning component may include an electric motor, a brush, etc. Each supply panel 202 may be cleaned by the brush driven by the electric motor, thereby effectively preventing a situation where accumulated dirt leads to a poor electrical contact after a long period of time.

Optionally, the power supply device 20 may further include a communication module.

The controller may be further configured to transmit to the communication module a movement control signal for negotiating with the external apparatus when identifying that only one supply panel 202 is in contact with the charging contacts, or only supply panels 202 having a same polarity are in contact with the charging contacts, or when no charging current is detected.

The communication module may be configured to transmit the movement control signal to the apparatus to be powered, to control the apparatus to be powered to move in response to the movement control signal.

For example, if the controller detects a relatively high pressure in only one supply panel 202, in only two or more anode supply panels 202, or in only two or more cathode supply panels 202, or if the controller detects that the supply panels 202 are in contact with the charging contacts but there is no current generated in any of the supply panels 202, then the controller may send a movement control signal to the communication module. The communication module may forward the movement control signal to a matching apparatus such as an aircraft, a remotely controlled vehicle, a robot, etc., to control the aircraft to take off and then land again, or to control the remotely controlled vehicle or the robot to move and then come into contact again, so as to enable the charging contacts to contact both anode and cathode supply panels.

By using a charging device and a power supply device consistent with the present disclosure, apparatuses such as various small unmanned aerial vehicles, remotely controlled vehicles, robots, etc., can have a quick access to a charging circuit for charging at a relatively low cost, without a need for precise positioning and moving, thus reducing a requirement and a difficulty of controlling the apparatuses. Additionally, a quick charging at large current may be possible due to a good electrical contact between charging panels and charging contacts, improving an efficiency of charging.

Figure 7:
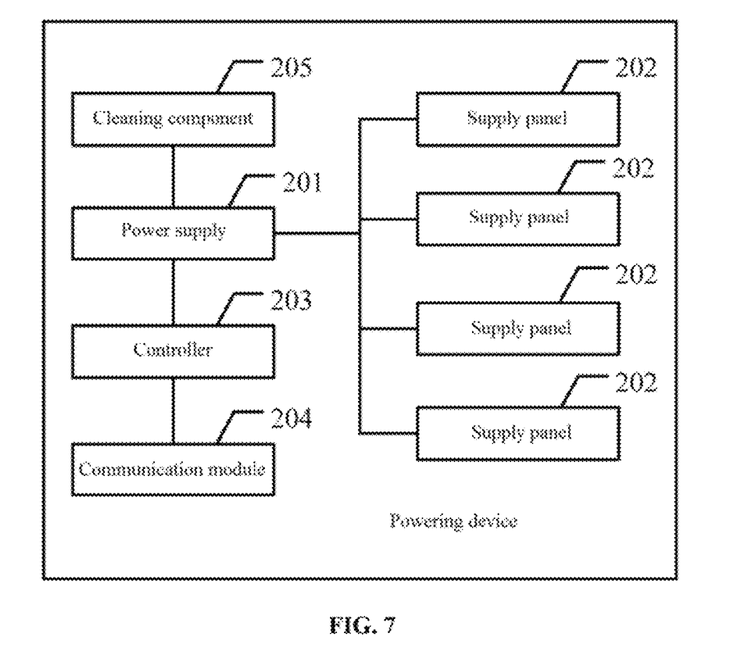
FIG. 7 is a schematic diagram showing a power supply device according to an embodiment of the present disclosure.

FIG. 7 is a schematic block diagram showing a power supply device 20 according to an embodiment of the present disclosure. The power supply device 20 may be arranged in a ground power supply station. In some instances, the power supply device 20 may be a platform for an aircraft to land and be automatically charged. Alternatively, the power supply device 20 may be a charging post for an apparatus such as a remotely controlled car on the ground, a robot, etc.

In some embodiments, the power supply device 20 may include a power supply 201 and at least two supply panels 202 exposed to the external environment. The supply panels 202 are connected to the power supply 201. In some instances, those supply panels connected to the anode of the power supply 201 may be arranged alternately with those supply panels connected to the cathode of the power supply 201, with each two supply panels being spaced with insulation.

The power supply device 20 may be connected with charging contacts of an external apparatus to be powered through the supply panels 202, in order to supply power to the apparatus to be powered.

In some embodiments, the power supply 201 may be a high-capacity battery or an electronic device, such as a converter, configured to be coupled to a utility grid for charging a corresponding apparatus such as an aircraft, a remotely controlled vehicle, a robot, etc. In some instances, the supply panels 202 may be, for example, copper plates. Optionally, the supply panels 202 may be removable electrically-conductive plates having a width and a length that can be adjusted manually as needed. In some embodiments, the supply panels 202 may be configured to have a large size in order to facilitate a contact with the charging contacts of the apparatus to be powered.

The supply panels 202 of the power supply device 20 are described in more detail with reference to FIG. 2 and FIG. 4 to FIG. 6.

Optionally, the power supply device 20 may further include a controller 203.

In some embodiments, the controller 203 may be configured to identify, among the supply panels 202 of the power supply device 20, one or more supply panels 202 that are in contact with at least one of the charging contacts of the external apparatus to be powered, and to control the power supply 201 to supply power to the identified supply panels 202, i.e., the contacted supply panels 201.

In some embodiments, the controller 203 may determine whether a supply panel 202 is in contact with a charging contact by detecting whether there exists, for example, a pressure on the supply panel 202 or an electric current generated by the supply panel 202.

In some instances, when pressure-induced deformation is detected in at least one anode supply panel 202 and at least one cathode supply panel 202, such as two neighboring supply panels 202, electric power may be supplied to these contacted supply panels 202.

Alternatively, the power supply device 20 may control the power supply 201 to supply power to the respective supply panels 202. When one or more of the charging contacts contact at least one anode supply panel 202 and at least one cathode supply panel 202, a loop may be formed, and a working current may be generated in circuits corresponding to the contacted supply panels 202. At this time, the controller 203 may control the power supply 201 to keep supplying power to the contacted supply panels 202 and stop supplying power to other supply panels 202. In some instances, the controller 203 may control the power supply 201 to supply power to the respective supply panels 202 upon reception of a power request signal transmitted from a device like the charging device 10, such that a current signal can be detected. In some embodiments, the controller 203 may control the power supply 201 to supply power to the respective supply panels 202 for short periods of time according to a preset powering rule, for example, a periodic short powering rule, so as to detect a current signal.

By means of the controller 203, power can be supplied to an apparatus, such as an aircraft, a remotely controlled vehicle, or a robot by supplying power only to those supply panels 202 that are in contact with charging contacts of the apparatus. As such, the number of supply panels 202 being powered can be reduced, and the risk of an accidental short-circuit can be effectively reduced.

In some embodiments, the controller 203 may be a processing chip.

Optionally, the power supply device 20 may further include a communication module 204.

The controller 203 may be further configured to transmit to the communication module 204 a movement control signal for negotiating with the external apparatus when identifying that only one supply panel 202 is in contact with the charging contacts, or only supply panels 202 having a same polarity are in contact with the charging contacts, or when no charging current is detected.

The communication module 204 may be configured to transmit the movement control signal to the apparatus to be powered, to control the apparatus to be powered to move in response to the movement control signal.

The communication module 204 may implement the communication by Bluetooth, infrared, mobile communication (such as 2G, 3G, or 4G), WiFi, etc.

For example, if the controller 203 detects a relatively high pressure in only one supply panel 202, in only two or more anode supply panels 202, or in only two or more cathode supply panels 202, or if the controller 203 detects that the supply panels 202 are in contact with the external charging contacts but there is no current generated in any of the supply panels 202, then the controller 203 may transmit a movement control signal to the communication module 204. The communication module 204 may forward the movement control signal to a matching apparatus such as an aircraft, a remotely controlled vehicle, a robot, etc., to control the aircraft to take off and then land again, or to control the remotely controlled vehicle or the robot to move and then come into contact again, so as to enable the charging contacts to contact both anode and cathode supply panels 202.

Optionally, the power supply device 20 may further include a cleaning component 205.

The cleaning component 205 may be configured to perform cleaning operations on the supply panels 202 according to a preset control rule. In some instances, the cleaning component 205 may include an electric motor, a brush, etc. Each supply panel 202 may be cleaned by the brush driven by the electric motor, thereby effectively preventing a situation where accumulated dirt leads to a poor electrical contact after a long period of time.

As is apparent from the embodiments of the present disclosure, the supply panels consistent with the disclosure can allow an apparatus, such as an unmanned aerial vehicle, a remotely controlled vehicle, or a robot, to quickly access a charging circuit at a relatively low cost in order to be charged, without a need for precise positioning and moving, thus reducing a requirement and a difficulty of controlling the apparatuses and improving an efficiency of charging.

Figure 8:
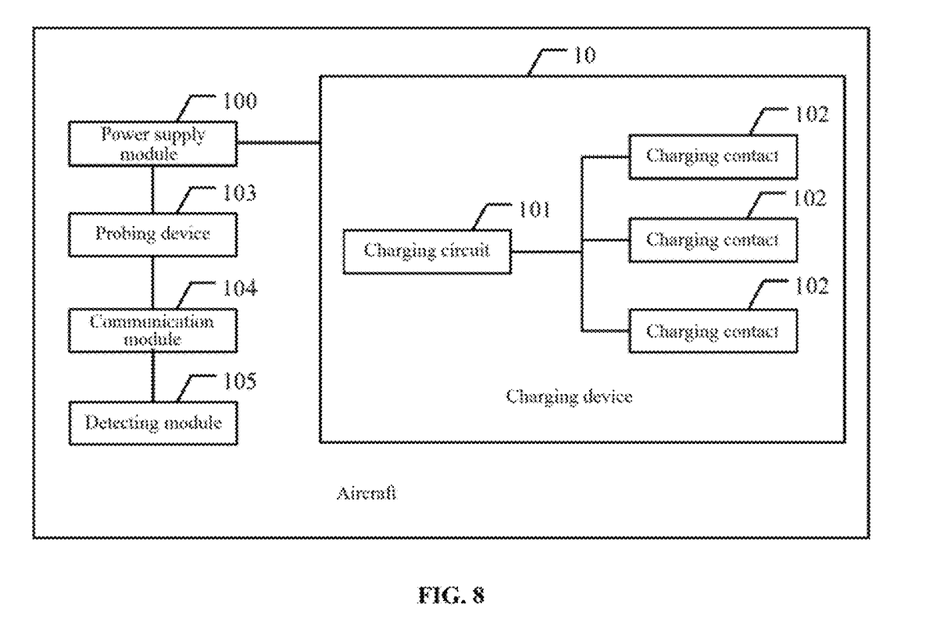
FIG. 8 is a schematic diagram showing an aircraft according to an embodiment of the present disclosure.

FIG. 8 is a schematic block diagram showing an aircraft according to an embodiment of the present disclosure. The aircraft may include a main structure, a power component, a navigation module, a motion sensor and other existing functional modules, which are not shown in FIG. 8. In some embodiments, the aircraft may further include a power supply module 100 and a charging device 10. In some instances, the charging device 10 may include at least two charging contacts 102 and a charging circuit 101 connected with the at least two charging contacts 102. The charging contacts 102 may each be connected with the charging anode and the charging cathode of the charging circuit 101 respectively through a diode.

The charging device 10 may contact at least two supply panels of an external power supply device through the charging contacts 102 in order to charge the connected power supply module 100. In some instances, the charging contacts 102 may be arranged on foot stands of the aircraft. Alternatively, the charging contacts 102 may be arranged as a set of retractable probes.

In some embodiments, the external power supply device may be the exemplary power supply device described above with reference to FIG. 7. A shape of the charging device 10 and a size of corresponding external power supply device may be shown in FIG. 2 and FIG. 4 to FIG. 6.

In some embodiments, the charging contacts 102 may each include a contact portion that is configured to contact the supply panels of the external power supply device. In some instances, a distance between any two points on a plane of the contact portion for contacting one of the supply panels of the external power supply device may be less than an initial distance, which is the shortest distance between any two supply panels of the external power supply device that are spaced apart from each other.

In some instances, the charging contacts 102 may be foot stands of the aircraft such as an unmanned aerial vehicle. Alternatively, the charging contacts 102 may be retractable probes installed on an apparatus such as a remotely controlled vehicle, a robot, etc. In some instances, the charging contact 102 may be a columnar such as a cylinder, a prism, and the like. The charging contacts 102 may each include a contact portion that is configured to contact the supply panels of the external power supply device. In some instances, the contact portion may be a columnar. In some embodiments, a distance between any two points on the bottom of the columnar contact portion is less than the initial distance.

Optionally, the charging contact 102 may further include a fixed portion and an elastic portion. In some embodiments, one end of the elastic portion may be connected with the fixed portion, and the other end of the elastic portion may be connected with the contact portion. The elastic portion may be a spring or another damping device. This design may reduce shock when the aircraft lands or when the remotely controlled vehicle or the robot contacts the supply panels, thereby alleviating a damage to the supply panels and to the aircraft. In addition, this design may ensure a good contact between the charging contacts and the supply panels.

Optionally, the charging device 10 may further include a probing device 103.

The probing device 103 may be configured to identify the locations of the at least two supply panels of the external power supply device, in order to instruct the aircraft to land.

In some embodiments, the probing device 103 may include any one or more of modules like a camera, an infrared locator, and a laser locator. In some instances, the aircraft may precisely land on the anode and cathode power supply panels of the external power supply device according to a simple pattern recognition based on an image captured by, e.g., the camera. Optionally, he aircraft may precisely land on the anode and cathode power supply panels of the external power supply device based on transmitted or received infrared rays or laser.

Optionally, the aircraft may further include a communication module 104.

The communication module 104 may be configured to instruct the aircraft to take off and land again in response to a movement control signal transmitted from the external power supply device when receiving the movement control signal.

The external power supply device may transmit a movement control signal for negotiating, when detecting that only one supply panel is in contact with the charging contacts 102 or when no current is detected on any of the supply panels. In some instances, the communication module 104 of the aircraft may forward the movement control signal to a flight controller of the aircraft when receiving the movement control signal. The flight controller may instruct the aircraft to take off and then land again in response to the movement control signal, so as to ensure the charging contacts 102 of the aircraft contact both anode and cathode supply panels.

Optionally, the aircraft may further include a detecting device 105.

The detecting device 105 may be configured to instruct the aircraft to take off and then land again if no charging current is detected in the charging circuit 101 after the aircraft lands on the supply panels of the external power supply device.

By using a charging device and a power supply device consistent with the present disclosure, apparatuses such as various small unmanned aerial vehicles, remotely controlled vehicles, robots, etc., can have a quick access to a charging circuit for charging at a relatively low cost, without a need for precise positioning and moving, thus reducing a requirement and a difficulty in controlling the apparatuses. Additionally, a quick charging at large current may be possible due to a good electrical contact between charging panels and charging contacts, improving an efficiency of charging.

In the embodiments of the disclosure, it shall be appreciated that the disclosed devices and methods can be embodied in other implementations. For example, the embodiments of the devices described above are merely illustrative. For example, the modules or units are divided merely as per their logical functions. The modules or units may be otherwise divided in other implementations. For example, more than one unit or component may be combined or may be integrated into another system, or some features may be omitted or may not be implemented. Moreover, a mutual coupling or a direct coupling or a communicative connection as illustrated or discussed may be an indirect coupling or a communicative connection via an interface, a device or an unit in the electrical, mechanism or another form.

The units described as separate components may or may not be physically separate, and the components illustrated as units may or may not be physical units. The units may be collocated or may be distributed onto a plurality of network elements. A part or all of the units may be selected as needed for the purpose of the solution according to the present embodiments.

Moreover, the respective functional units in the embodiments of the disclosure may be integrated in one processing unit, or may be embodied as physically separate units. Alternatively, two or more of the units may be integrated in one unit. The integrated units above may be embodied in a form of hardware or may be embodied in a form of functional units in software.

The integrated units may be stored in a computer readable storage medium if they are embodied in the form of functional units in software and sold or used as separate products. With such understanding, the technical solution of the disclosure essentially or the part thereof contributing to the existing technologies or all or a part of the technical solution can be embodied in the form of a software product, stored in a storage medium, including several instructions to cause a computer processor to perform all or part of a method consistent with the disclosure. The storage medium above includes a U-disk, a mobile disk, a Read-Only Memory (ROM), a Random Access Memory (RAM), a magnetic disk, an optical disk, or another medium in which program codes are stored.

The foregoing is merely a description of embodiments of the disclosure but not intended to limit the scope of the disclosure, and equivalent structural or flow changes made without departing from the description and the drawings of the disclosure, or an application thereof in other relevant arts directly or indirectly, shall fall into the claimed scope of the disclosure.

What is claimed is:

1. A charging system, comprising:
   a power supply device including:
      a power supply; and
      at least two exposed power supply panels that are connected to the power supply, the at least two power supply panels being electrically insulated from each other and including:
         at least one anode power supply panel connected to an anode of the power supply; and
         at least one cathode power supply panel connected to a cathode of the power supply,
         wherein the at least one anode power supply panel and the at least one cathode power supply panel are alternately arranged;
   a charging device including:
      a charging circuit; and
      at least two charging contacts each being connected to a charging anode and a charging cathode of the charging circuit respectively through a diode,
   wherein the charging device is configured to contact the power supply panels through the charging contacts to charge a connected load.

2. The system of claim 1, wherein:
   each of the charging contacts includes a contact portion configured to contact the power supply panels, and
   a distance between any two points on a contact plane of the contact portion for contacting the supply panel is less than a smallest distance between any two of the power supply panels.

3. The system of claim 2, wherein:
   the contact portion includes a columnar, and
   the contact plane is a bottom plane of the columnar.

4. The system of claim 2, wherein each of the charging contacts further includes a fixed portion and an elastic portion, one end of the elastic portion being connected with the fixed portion, and another end of the elastic portion being connected with the contact portion.

5. The system of claim 1, wherein the power supply device further includes a controller configured to identify whether any of the power supply panels are in contact with one or more of the charging contacts.

6. The system of claim 5, wherein the controller is further configured to, if one of the at least one anode power supply panel and one of the at least one cathode power supply panel are identified, control the power supply to supply power to the identified power supply panels.

7. The system of claim 5, wherein the controller is further configured to identify whether any of the power supply panels are in contact with one or more of the charging contacts by:
   detecting whether pressure-induced deformation exists in any of the power supply panels; and
   identifying the power supply panel that has pressure-induced deformation as being in contact with one or more of the charging contacts.

8. The system of claim 5, wherein the controller is further configured to identify whether any of the power supply panels are in contact with one or more of the charging contacts by:
   supplying power to the power supply panels;
   detecting whether an electric current is generated in any of the power supply panels; and
   identifying the power supply panel that has the electric current as being in contact with one or more of the charging contacts.

9. A power supply device, comprising:
   a power supply; and
   at least two exposed power supply panels that are connected to the power supply, the at least two power supply panels being electrically insulated from each other and including:
      at least one anode power supply panel connected to an anode of the power supply; and
      at least one cathode power supply panel connected to a cathode of the power supply,
   wherein the at least one anode power supply panel and the at least one cathode power supply panel are alternately arranged,
   wherein the power supply device is configured to be in contact with charging contacts of an external apparatus through the power supply panels to supply power to the external apparatus.

10. The device of claim 9, further comprising:
    a controller configured to identify whether any of the power supply panels are in contact with one or more of the charging contacts.

11. The device of claim 10, wherein the controller is further configured to, if one of the at least one anode power supply panel and one of the at least one cathode power supply panel are identified, control the power supply to supply power to the identified power supply panels.

12. The device of claim 10, further comprising:
    a communication module,
    wherein:
      the controller is further configured to transmit to the communication module a movement control signal if:
         no power supply panel is identified,
         only one power supply panel is identified, or
         only multiple anode power supply panels or multiple cathode power supply panels are identified, and
      the communication module is configured to transmit the movement control signal to the external apparatus to control the external apparatus to move in response to the movement control signal.

13. The device of claim 10, further comprising:
    a cleaning component configured to perform cleaning operation on the power supply panels based on a preset control rule.

14. An aircraft, comprising:
    a power supply module; and
    a charging device coupled to the power supply module, the charging device including:
       a charging circuit; and
       at least two charging contacts each being connected to a charging anode and a charging cathode of the charging circuit respectively through a diode,
    wherein the charging device is configured to contact at least two power supply panels of an external power supply device through the charging contacts to charge the power supply module.

15. The aircraft of claim 14, wherein:
    each of the charging contacts includes a contact portion configured to contact the power supply panels, and
    a distance between any two points on a contact plane of the contact portion for contacting the supply panel is less than a smallest distance between any two of the power supply panels.

16. The aircraft of claim 15, wherein:
    the contact portion includes a columnar, and
    the contact plane is a bottom plane of the columnar.

17. The aircraft of claim 15, wherein each of the charging contacts further includes a fixed portion and an elastic portion, one end of the elastic portion being connected with the fixed portion, and another end of the elastic portion being connected with the contact portion.

18. The aircraft of claim 14, further comprising:
    a probing device configured to identify locations of the at least two power supply panels of the external power supply device to instruct the aircraft to land.

19. The aircraft of claim 14, further comprising:
    a communication module configured to instruct the aircraft to take off, move, and land in response to a movement control signal transmitted from the external power supply device.

20. The aircraft of claim 14, further comprising:
    a detecting device configured to instruct the aircraft to take off, move, and land when detecting that no charging current is generated in the charging circuit after the aircraft lands on the supply panels of the external power supply device.

* * * * *